(12) United States Patent
Krotosky et al.

(10) Patent No.: US 11,514,733 B1
(45) Date of Patent: Nov. 29, 2022

(54) EXTENDED TIME SCALE EVENT DETECTION

(71) Applicant: Lytx, Inc., San Diego, CA (US)

(72) Inventors: Stephen Krotosky, San Diego, CA (US); Quoc Chan Quach, San Diego, CA (US); Daniel Lambert, Carlsbad, CA (US)

(73) Assignee: Lytx, Inc., San Diego, CA (US)

( * ) Notice: Subject to any disclaimer, the term of this patent is extended or adjusted under 35 U.S.C. 154(b) by 434 days.

(21) Appl. No.: 15/485,074

(22) Filed: Apr. 11, 2017

(51) Int. Cl.
*G07C 5/10* (2006.01)
*H04L 67/12* (2022.01)
*G07C 5/08* (2006.01)

(52) U.S. Cl.
CPC ............. *G07C 5/10* (2013.01); *G07C 5/0858* (2013.01); *G07C 5/0866* (2013.01); *G07C 5/0875* (2013.01); *H04L 67/12* (2013.01)

(58) Field of Classification Search
None
See application file for complete search history.

(56) References Cited

U.S. PATENT DOCUMENTS

| | | | | |
|---|---|---|---|---|
| 8,890,717 | B2 * | 11/2014 | McClellan | G01S 5/0027 340/936 |
| 9,595,191 | B1 * | 3/2017 | Surpi | G08G 1/052 |
| 9,685,098 | B1 * | 6/2017 | Kypri | G09B 19/167 |
| 2003/0110849 | A1 * | 6/2003 | Lonzinski | B60T 13/665 73/121 |
| 2004/0236475 | A1 * | 11/2004 | Chowdhary | G06Q 30/0601 701/1 |
| 2006/0095175 | A1 * | 5/2006 | deWaal | G07C 5/008 701/31.4 |
| 2007/0132773 | A1 * | 6/2007 | Plante | G07C 5/0891 345/564 |
| 2009/0273672 | A1 * | 11/2009 | Koudritski | B60R 25/1004 348/148 |
| 2010/0023207 | A1 * | 1/2010 | Maeda | G07C 5/085 701/33.4 |
| 2013/0197774 | A1 * | 8/2013 | Denson | G07C 5/008 701/99 |
| 2014/0002651 | A1 * | 1/2014 | Plante | H04N 5/76 348/148 |
| 2015/0181172 | A1 * | 6/2015 | Plante | G07C 5/008 348/148 |
| 2016/0063776 | A1 * | 3/2016 | Chronowski | G07C 5/085 701/29.1 |

* cited by examiner

*Primary Examiner* — Navid Z. Mehdizadeh
(74) *Attorney, Agent, or Firm* — Van Pelt, Yi & James LLP

(57) ABSTRACT

A system for extended time scale event detection includes a data storage device and a processor. The data storage device is configured to store sensor data associated with a vehicle. The processor is configured to analyze an extended time period of the sensor data to identify minor events. The minor events are detected using a minor event threshold. The processor is further configured to determine whether there are more than a threshold number of the minor events and, in the event there are more than a threshold number of the minor events, flag the minor events.

12 Claims, 10 Drawing Sheets

US 11,514,733 B1

EXTENDED TIME SCALE EVENT DETECTION

BACKGROUND OF THE INVENTION

Modern vehicles (e.g., airplanes, boats, trains, cars, trucks, etc.) can include a vehicle event recorder in order to better understand the timeline of an anomalous event (e.g., an accident). A vehicle event recorder typically includes a set of sensors—for example, video recorders, audio recorders, accelerometers, gyroscopes, vehicle state sensors, GPS (global positioning system), etc., that report data, which is used to determine the occurrence of an anomalous event. Sensor data is reviewed to determine anomalous events by the vehicle event recorder or by an external reviewing system. Anomalous event types include accident anomalous events, maneuver anomalous events, location anomalous events, proximity anomalous events, vehicle malfunction anomalous events, driver behavior anomalous events, or any other anomalous event types. Some anomalous event types are determined by determining whether a data signal (e.g., a sensor data signal or a derived data signal) crosses a threshold. A smaller minor event that does not cause the data signal to cross the threshold may however still be relevant.

BRIEF DESCRIPTION OF THE DRAWINGS

Various embodiments of the invention are disclosed in the following detailed description and the accompanying drawings.

DETAILED DESCRIPTION

Figure 1:
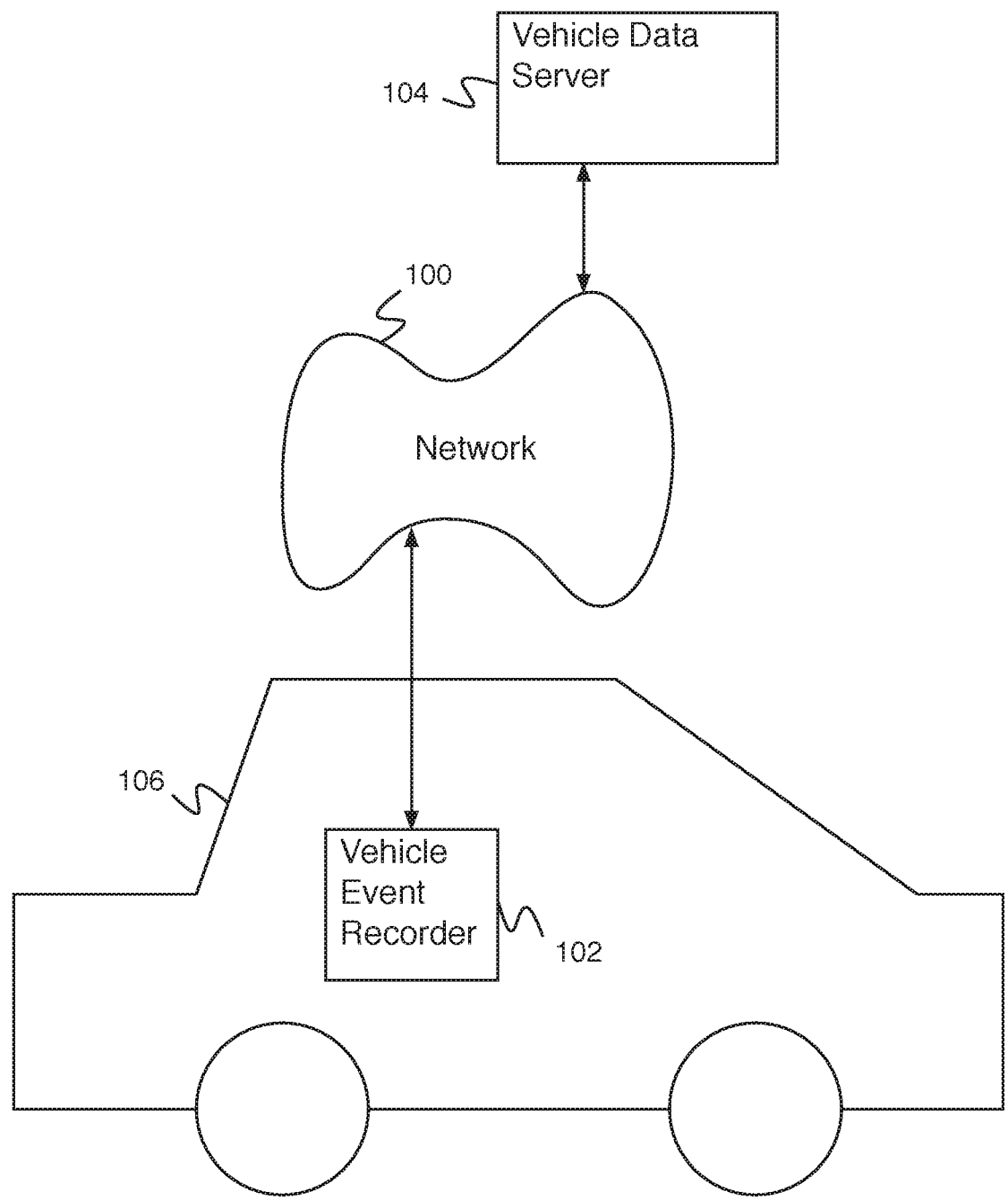
FIG. 1 is a block diagram illustrating an embodiment of a system including a vehicle event recorder.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for extended time scale event detection comprises a data storage device configured to store sensor data associated with a vehicle, and a processor configured to analyze an extended time period of the sensor data to identify minor events, wherein minor events are detected using a minor event threshold, determine whether there are more than a threshold number of the minor events, and in the event there are more than a threshold number of the minor events, flag the minor events.

In some embodiments, a system for extended time scale event detection comprises a system for performing event detection from data. A system for performing event detection from data receives data from one or more data sources and analyzes the data to identify anomalous events. The system for extended time scale event detection receives sensor data associated with a vehicle (e.g., vehicle system data, external sensor data, audio or video recorder data, etc.). Some events comprise lookback indicators (e.g., an indicator signifying that the events, although not rising to the threshold of being flagged, deserve a second analysis particularly over longer time scales). When a lookback indicator is detected, the system for extended time scale event detection analyzes previously stored data (e.g., data that has already been analyzed for events) using more sensitive thresholds. In various embodiments, a lookback indicator type is associated with one or more event types to look for, the more sensitive thresholds associated with the event types, the time period over which to analyze previously stored data, a threshold number of events to detect (e.g., if a number of events are detected that is less than the threshold the events are not flagged), etc. Events detected using the more sensitive thresholds that were not detected using default thresholds are flagged as minor events in the event that more than the threshold number is detected.

FIG. 1 is a block diagram illustrating an embodiment of a system including a vehicle event recorder. In the example shown, vehicle event recorder 102 comprises a vehicle event recorder mounted in a vehicle (e.g., a car or truck). Vehicle event recorder 102 includes or is in communication with a set of sensors—for example, video recorders, audio recorders, accelerometers, gyroscopes, vehicle state sensors, proximity sensors, a global positioning system (e.g., GPS), outdoor temperature sensors, moisture sensors, laser line tracker sensors, or any other appropriate sensors. In various embodiments, vehicle state sensors comprise a speedometer, an accelerator pedal sensor, a brake pedal sensor, an engine revolutions per minute (e.g., RPM) sensor, an engine temperature sensor, a headlight sensor, an airbag deployment sensor, driver and passenger seat weight sensors, an anti-locking brake sensor, traction control system sensors, drive wheel speed sensors, shocks sensors, an engine exhaust sensor, a gear position sensor, a cabin equipment operation sensor, or any other appropriate vehicle state sensors. Vehicle event recorder 102 comprises a system for receiving and processing sensor data. In some embodiments, vehicle event recorder 102 comprises a system for detecting events. In various embodiments, vehicle event recorder 102 is mounted on vehicle 106 in one of the following locations: the chassis, the front grill, the dashboard, the rear-view mirror, or any other appropriate location. In some embodiments, vehicle event recorder 102 comprises multiple units mounted in different locations in vehicle 106. In some embodiments, vehicle event recorder 102 comprises a communications system for communicating with network 100. Network 100 comprises a network for communications. In various embodiments, network 100 comprises a wireless network, a wired network, a cellular network, a Code Division Multiple Access (CDMA) network, a Global System for Mobile Communication (GSM) network, a Long-Term Evolution (LTE) network, a Universal Mobile Telecommunications System (UMTS) network, a Worldwide Interoperability for Microwave Access (WiMAX) network, a Dedicated Short-Range Communications (DSRC) network, a local area network, a wide area network, the Internet, or any other appropriate network. In some embodiments, network 100 comprises multiple networks, changing over time and location. In some embodiments, different networks comprising network 100 comprise different bandwidth cost (e.g., a wired network has a very low cost, a wireless Ethernet connection has a moderate cost, a cellular data network has a high cost). In some embodiments, network 100 has a different cost at different times (e.g., a higher cost during the day and a lower cost at night). Vehicle event recorder 102 communicates with vehicle data server 104 via network 100.

In some embodiments, vehicle event recorder 102 is mounted to vehicle 106. In various embodiments, vehicle 106 comprises a car, a truck, a commercial vehicle, or any other appropriate vehicle. Vehicle data server 104 comprises a vehicle data server for collecting events and risky behavior detected by vehicle event recorder 102. In some embodiments, vehicle data server 104 comprises a system for collecting data from multiple vehicle event recorders. In some embodiments, vehicle data server 104 comprises a system for analyzing vehicle event recorder data. In some embodiments, vehicle data server 104 comprises a system for displaying vehicle event recorder data. In some embodiments, vehicle data server 104 is located at a home station (e.g., a shipping company office, a taxi dispatcher, a truck depot, etc.). In various embodiments, vehicle data server 104 is located at a colocation center (e.g., a center where equipment, space, and bandwidth are available for rental), at a cloud service provider, or any at other appropriate location. In some embodiments, events recorded by vehicle event recorder 102 are downloaded to vehicle data server 104 when vehicle 106 arrives at the home station. In some embodiments, vehicle data server 104 is located at a remote location. In some embodiments, events recorded by vehicle event recorder 102 are downloaded to vehicle data server 104 wirelessly. In some embodiments, a subset of events recorded by vehicle event recorder 102 is downloaded to vehicle data server 104 wirelessly.

Figure 2:
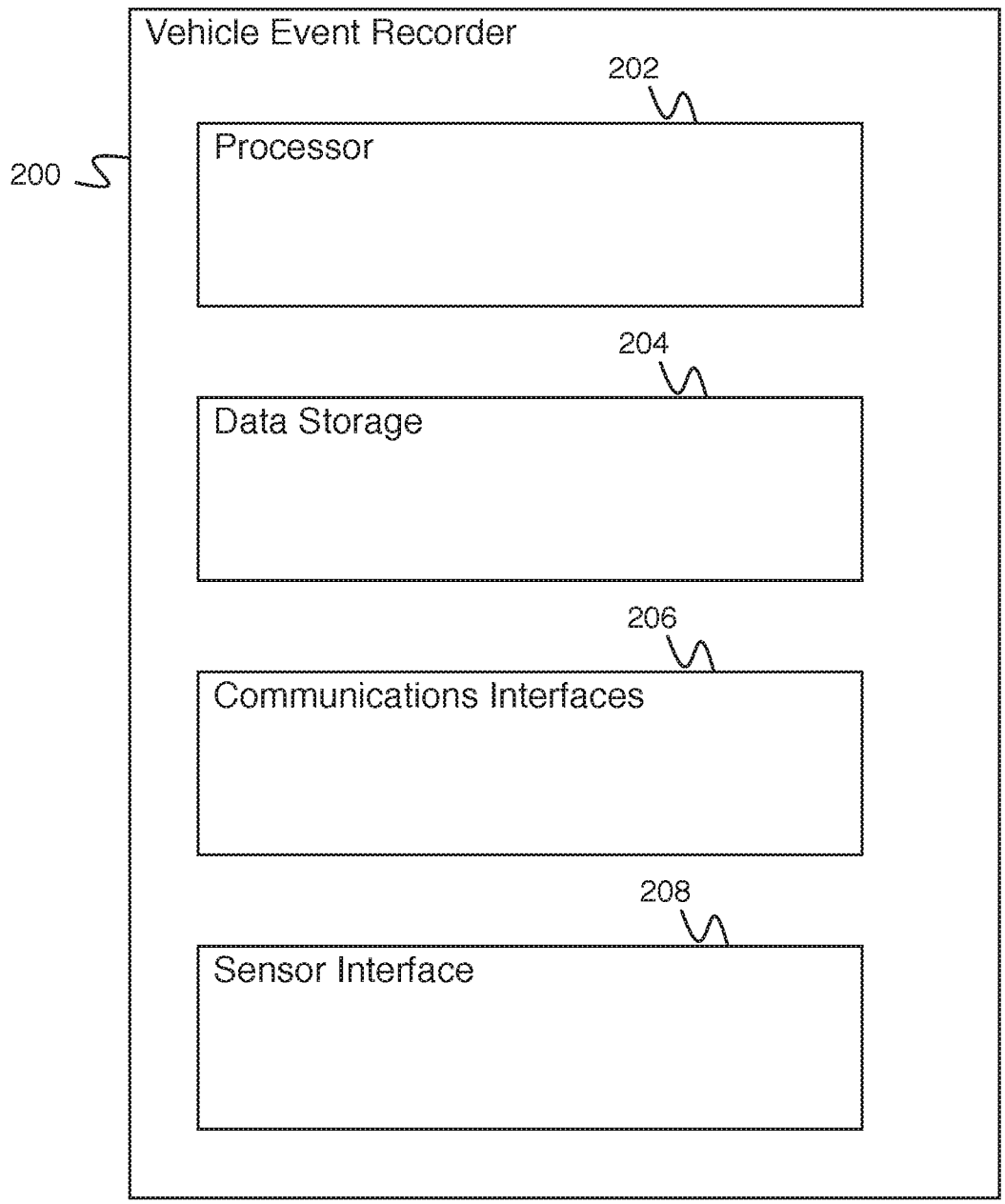
FIG. 2 is a block diagram illustrating an embodiment of a vehicle event recorder.

FIG. 2 is a block diagram illustrating an embodiment of a vehicle event recorder. In some embodiments, vehicle event recorder 200 of FIG. 2 comprises vehicle event recorder 102 of FIG. 1. In the example shown, vehicle event recorder 200 comprises processor 202. Processor 202 comprises a processor for controlling the operations of vehicle event recorder 200, for reading and writing information on data storage 204, for communicating via wireless communications interface 206, and for reading data via sensor interface 208. In various embodiments, processor 202 comprises a processor for determining a vehicle characterization, determining a vehicle identifier, determining a maintenance item, or for any other appropriate purpose. Data storage 204 comprises a data storage (e.g., a random access memory (RAM), a read only memory (ROM), a nonvolatile memory, a flash memory, an integrated circuit memory, a hard drive, a removable media storage device, a magnetic data storage device an optical data storage device, a video cassette recorder, a digital video recorder, or any other appropriate data storage). In various embodiments, data storage 204 comprises a data storage for storing instructions for processor 202, vehicle event recorder data, vehicle event data, sensor data, video data, driver scores, or any other appropriate data. In various embodiments, communications interfaces 206 comprises one or more of a GSM interface, a CDMA interface, a LTE interface, a WiFi™ interface, an Ethernet interface, a Universal Serial Bus (USB) interface, a Bluetooth™ interface, an Internet interface, or any other appropriate interface. Sensor interface 208 comprises an interface to one or more vehicle event recorder sensors. In various embodiments, vehicle event recorder sensors comprise an exterior video camera, an exterior still camera, an interior video camera, an interior still camera, a microphone, an accelerometer, a gyroscope, an outdoor temperature sensor, a moisture sensor, a laser line tracker sensor, vehicle state sensors, or any other appropriate sensors. In various embodiments, vehicle state sensors comprise a speedometer, an accelerator pedal sensor, a brake pedal sensor, an engine revolutions per minute (RPM) sensor, an engine temperature sensor, a headlight sensor, an airbag deployment sensor, driver and passenger seat weight sensors, an anti-locking brake sensor, shocks sensors, an engine exhaust sensor, a gear position sensor, a turn signal sensor, a cabin equipment operation sensor, or any other appropriate vehicle state sensors. In some embodiments, sensor interface 208 comprises an on-board diagnostics (OBD) bus (e.g., society of automotive engineers (SAE) J1939, J1708/J1587, OBD-II, CAN BUS, etc.). In some embodiments, vehicle event recorder 200 communicates with vehicle state sensors via the OBD bus. In some embodiments, vehicle event recorder 200 communicates with a vehicle data server via communications interfaces 206. In various embodiments, vehicle event recorder 200 transmits vehicle state sensor data, accelerometer data, speed data, maneuver data, audio data, video data, event data, or any other appropriate data to the vehicle data server. In some embodiments, vehicle event recorder 200 receives an indication of a route from the vehicle data server. In some embodiments, vehicle event recorder 200 receives a set of route segment safety scores from the vehicle data server and determines a route based at least in part on the set of route segment safety scores.

In some embodiments, vehicle event recorder 200 comprises a system for determining events from data. In some embodiments, vehicle event recorder 200 stores data in a time-delay buffer (e.g., a buffer holding the last 30 seconds of data, the last 5 minutes of data, etc.). In some embodiments, data is deleted from the time-delay buffer after the time-delay period (e.g., a buffer holding the last 30 seconds of data deletes data as soon as it is more than 30 seconds old). In some embodiments, in the event an event is determined from data in the time-delay buffer, data associated with the event is copied from the time-delay buffer into a long-term storage. In various embodiments, event information and associated data is stored, processed, uploaded immediately, uploaded at a later time, provided to an administrator, or handled in any other appropriate way. In some embodiments, data is continually stored (e.g., and not deleted after a time-delay period). In some embodiments, in the event an event is determined from continuously stored data, an event flag is stored associated with the continuously stored data. In some embodiments, data storage is modified based at least in part on an event flag (e.g., data is stored at higher resolution in the vicinity of an event flag). In some embodiments, event data is extracted from continuously stored data. In some embodiments, event data is uploaded (e.g., immediately, at a later time, etc.). In some embodiments, flag data (e.g., an event type, an event severity, etc.) is uploaded. In some embodiments, flag metadata (e.g., a list of flags, a flag identifier, etc.) is uploaded. In some embodiments, a lookback indicator (e.g., an indicator indicating to analyze previously stored data using more sensitive thresholds) is determined from data. In some embodiments, minor events are determined from data as a result of analyzing previously stored data in response to a lookback indicator.

Figure 3:
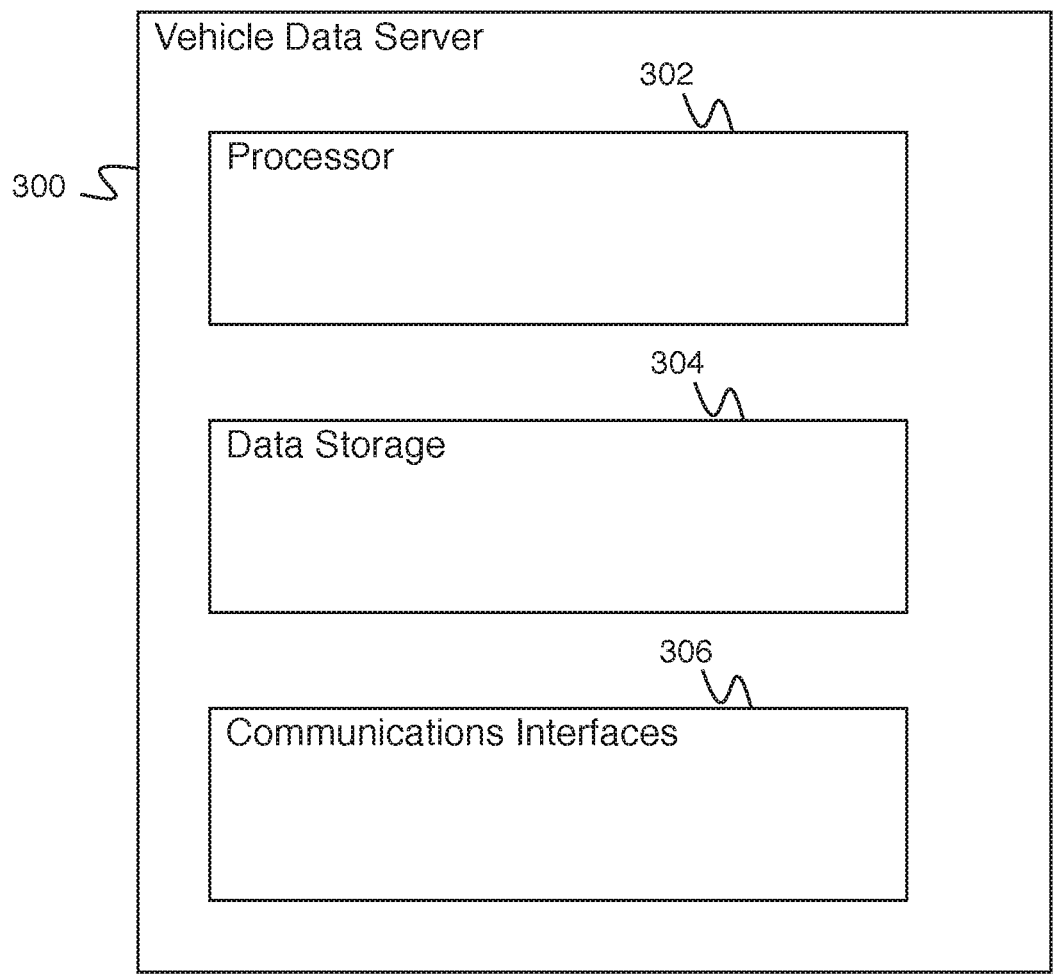
FIG. 3 is a block diagram illustrating an embodiment of a vehicle data server.

FIG. 3 is a block diagram illustrating an embodiment of a vehicle data server. In some embodiments, vehicle data server 300 comprises vehicle data server 104 of FIG. 1. In the example shown, vehicle data server 300 comprises processor 302. In various embodiments, processor 302 comprises a processor for determining a route, determining a set of route segments, determining a route segment safety score, collecting speed data, determining a speed distribution, or for any other appropriate purpose. Data storage 304 comprises a data storage (e.g., a random access memory (RAM), a read only memory (ROM), a nonvolatile memory, a flash memory, a hard disk, or any other appropriate data storage). In various embodiments, data storage 304 comprises a data storage for storing instructions for processor 302, vehicle event recorder data, vehicle event data, sensor data, video data, map data, machine learning algorithm data, or any other appropriate data. In various embodiments, communications interfaces 306 comprises one or more of a GSM interface, a CDMA interface, a WiFi interface, an Ethernet interface, a USB interface, a Bluetooth interface, an Internet interface, a fiber optic interface, or any other appropriate interface. In various embodiments, vehicle data server 300 receives events, maneuvers, data, or any other appropriate information from one or more vehicle event recorders.

Figure 4:
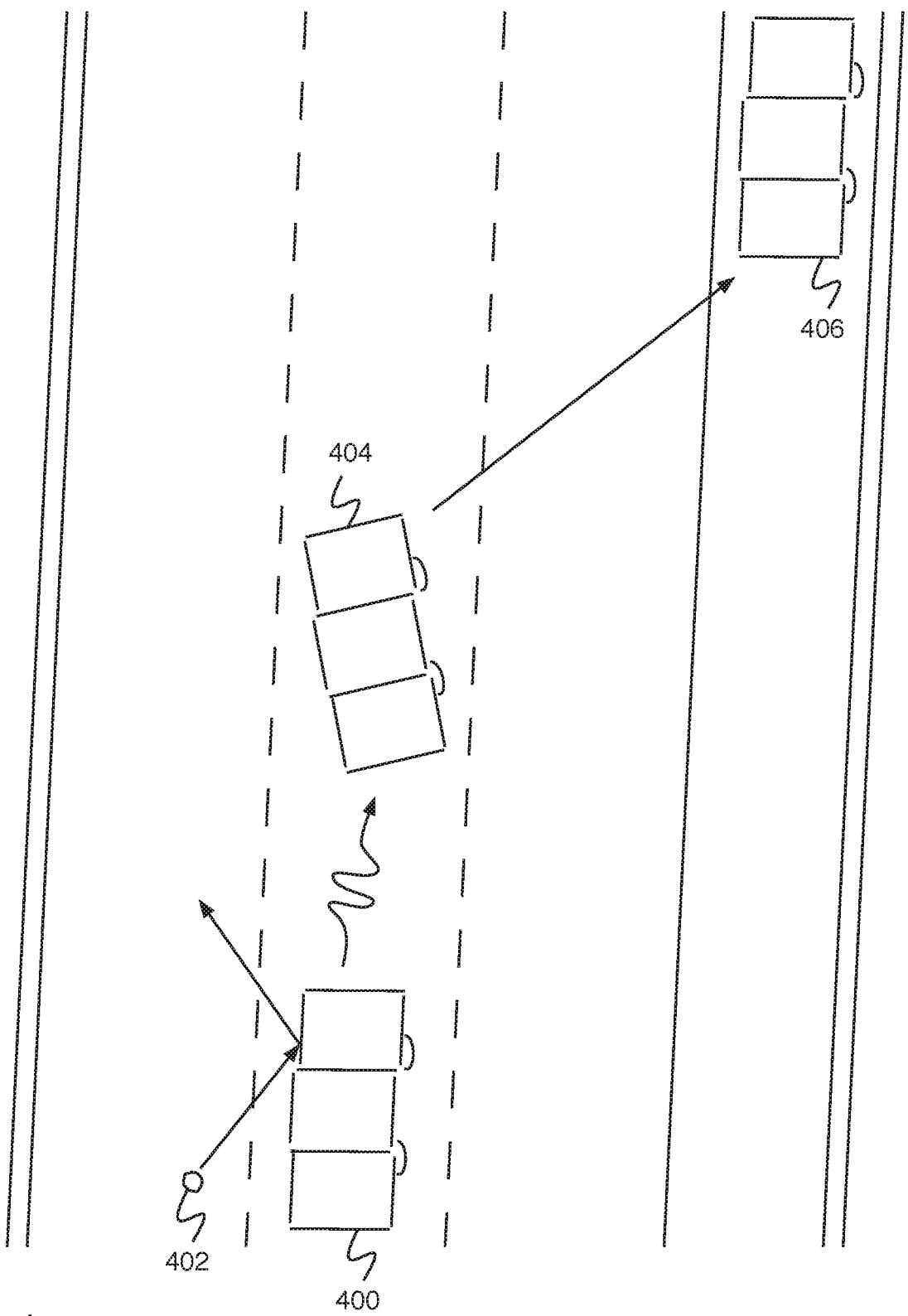
FIG. 4 is a diagram illustrating an embodiment of vehicle events.

FIG. 4 is a diagram illustrating an embodiment of vehicle events. In some embodiments, vehicle 400 comprises a vehicle with a vehicle event recorder installed (e.g. vehicle 106 of FIG. 1). In the example shown, vehicle 400 comprises a vehicle driving on a multi-lane highway. Object 402 comprises an object on the highway that collides with vehicle 400. In various embodiments, object 402 comprises a pebble, a rock, a vehicle part, or any other appropriate object. In various embodiments, object 402 is dropped from vehicle 400, dropped by a different vehicle, kicked by a vehicle, or stimulated in any other appropriate way. Object 402 collides with and bounces off of vehicle 400. Vehicle 404 comprises vehicle 400 after performing a small swerve in response to the collision of object 402. Vehicle 406 comprises vehicle 400 after performing a rapid lane change and stopping in the road shoulder in response to the collision of object 402 and subsequent swerve. Data associated with the collision of object 402 and the small swerve are recorded by the event recorder of vehicle 400. The collision of object 402 and the small swerve are too small to prompt flagging as events for later review. In some embodiments, stopping in the road shoulder comprises a lookback event (e.g., an event indicating to review recently recorded data in order to identify minor events). In some embodiments, upon review in response to the lookback event, the collision of object 402 and the small swerve are flagged as minor events.

Figure 5:
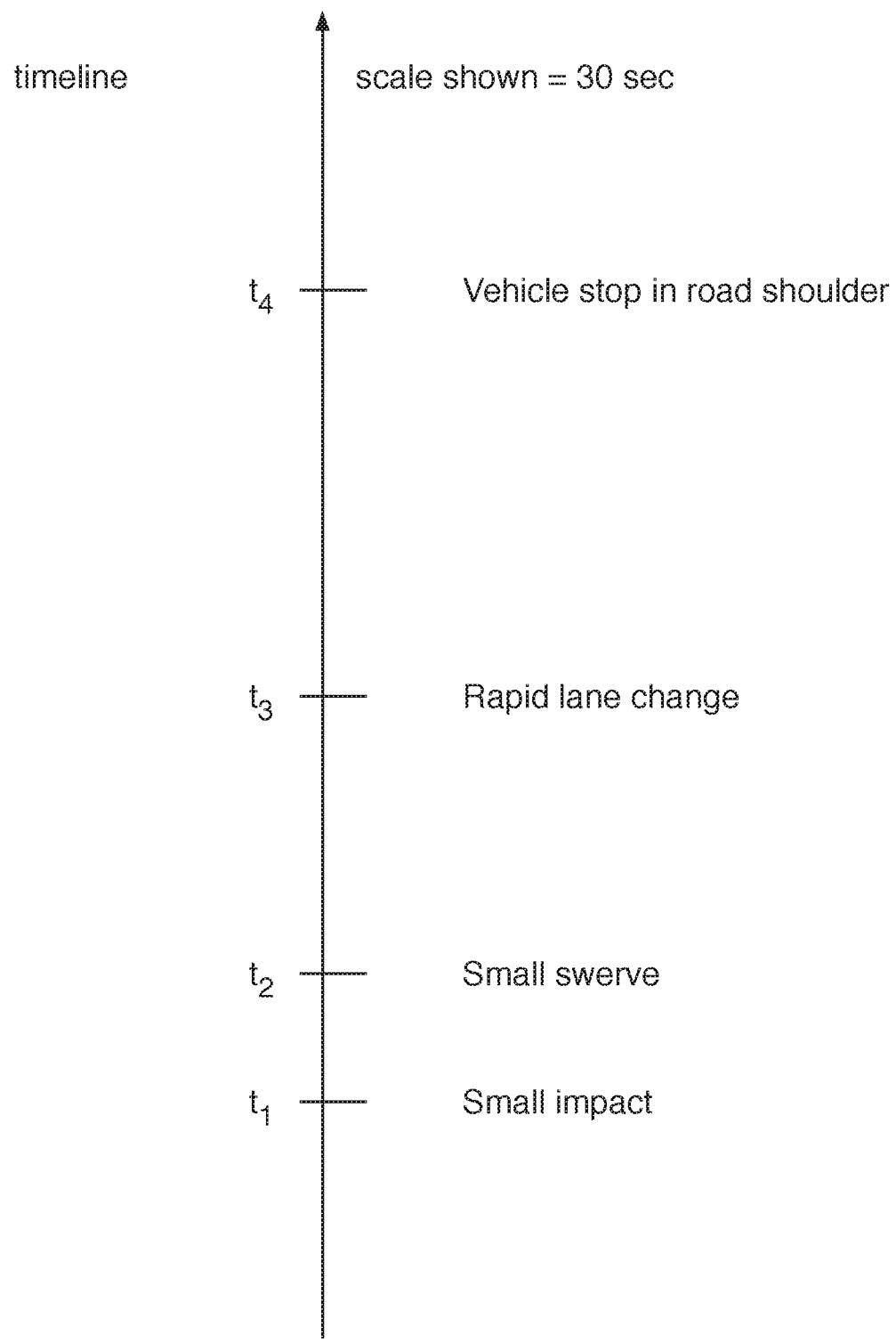
FIG. 5 is a diagram illustrating a timeline of vehicle events.

FIG. 5 is a diagram illustrating a timeline of vehicle events. In some embodiments, the timeline of vehicle events of FIG. 5 corresponds to the vehicle events shown in FIG. 4. In the example shown, time proceeds upwards on the timeline with an overall scale of 30 seconds. At time $t_1$, sensor data shows a small impact. At time $t_2$, sensor data shows a small swerve. At time $t_3$, sensor data shows a rapid lane change. At time $t_4$, sensor data shows a vehicle stop in the road shoulder. In some embodiments, the small impact event at time $t_1$ and the small swerve event at time $t_2$ comprise minor events (e.g., events small enough such that they are not flagged as events when initially sensed but large enough such that they are flagged as events when the time period is reviewed in response to the detection of a lookback event). In some embodiments, the vehicle stopping in the road shoulder at time $t_4$ comprises a lookback event, prompting review of a time period preceding time $t_4$. In some embodiments, when the time period preceding time $t_4$ is reviewed, the small impact at time $t_1$ and small swerve at time $t_2$ are changed from not being flagged as events to being flagged as minor events. In some embodiments, a lookback event is indicated in the event that a number of minor events are detected within a window of time (e.g., within a half hour, within 15 minutes, within a half day, etc.).

Figure 6:
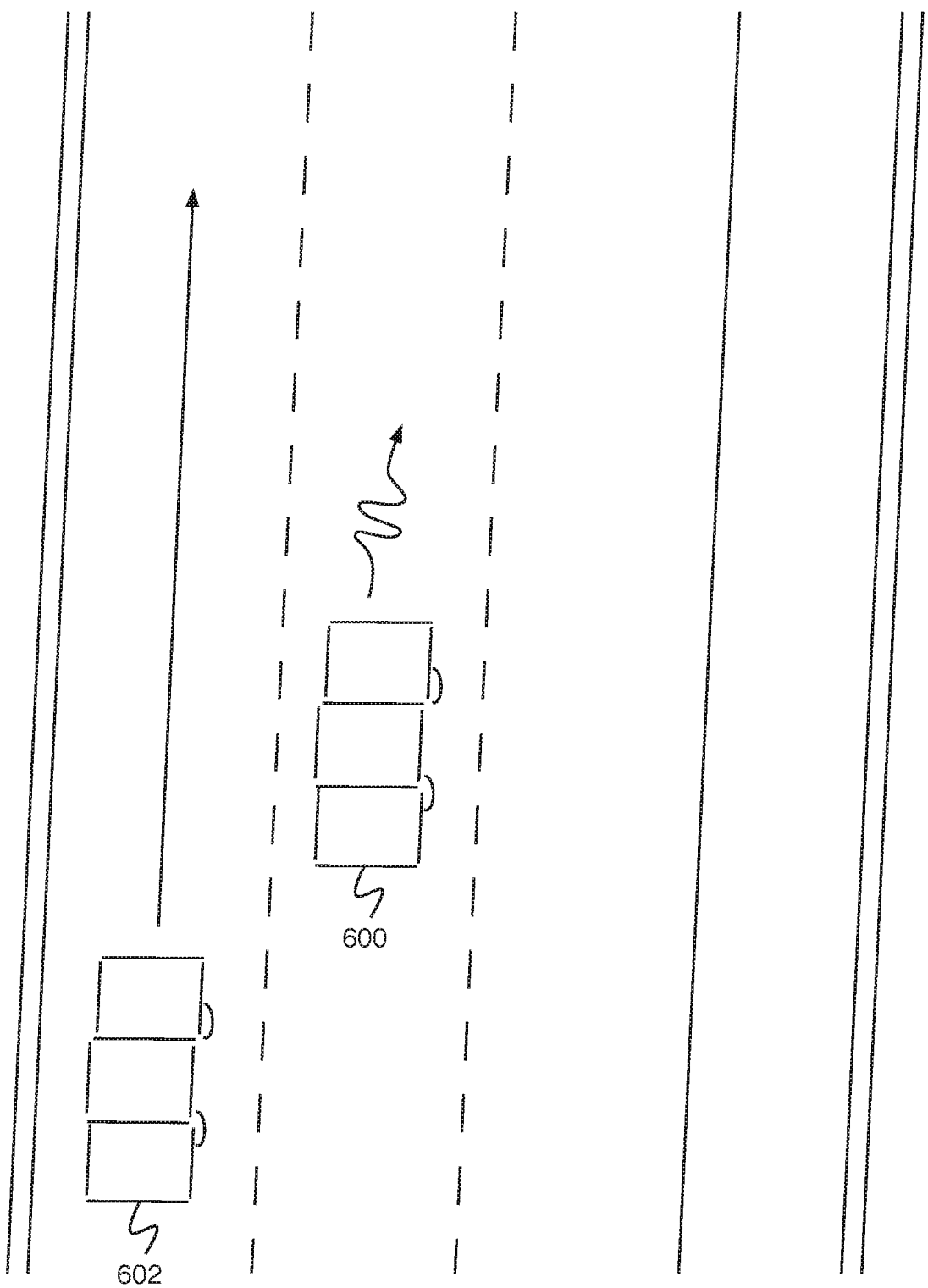
FIG. 6 is a diagram illustrating an embodiment of vehicle events.

FIG. 6 is a diagram illustrating an embodiment of vehicle events. In some embodiments, vehicle 600 comprises a vehicle with a vehicle event recorder installed (e.g. vehicle 106 of FIG. 1). In the example shown, vehicle 600 comprises a vehicle driving on a multi-lane highway. Vehicle 602 comprises a second vehicle driving on the multi-lane highway, in the lane to the left of vehicle 600. Vehicle 602 passes vehicle 600 and vehicle 600 performs a small swerve in response (for example, as a response to the surprise of seeing the vehicle when not expecting it). The small swerve is too small to prompt flagging for later review. However, in the event vehicle 600 performs a small swerve frequently (e.g., several times a day), the swerve should be flagged as a minor event. In some embodiments, this is accomplished by indicating an end-of-day indication as a lookback event (e.g., indicating that at the end of the day sensor data should be reviewed for minor events). A lookback event comprises a minor event frequency threshold; when sensor data is reviewed in response to an end-of-day lookback event, only if more than the threshold number of minor events are detected are they flagged as minor events. For example, if the threshold associated with small swerve events is set to 2, only in the event that more than 2 small swerve events are detected are the small swerve events flagged as minor events. In some embodiments, a lookback event is indicated in the event that a number of minor events are detected within a window of time (e.g., within a half hour, within 15 minutes, within a half day, etc.).

Figure 7:
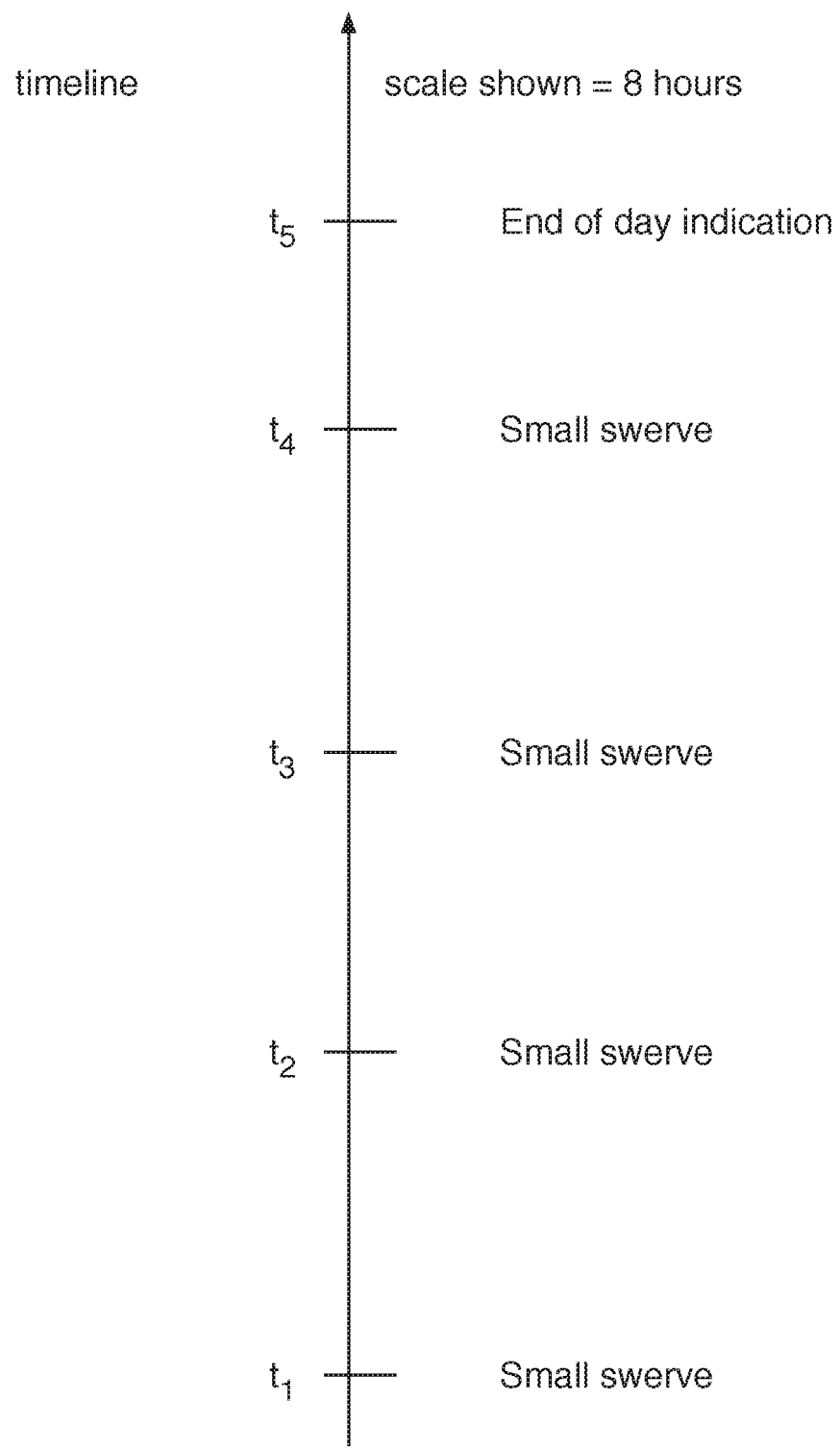
FIG. 7 is a diagram illustrating a timeline of vehicle events.

FIG. 7 is a diagram illustrating a timeline of vehicle events. In some embodiments, the timeline of vehicle events of FIG. 7 includes the vehicle event of FIG. 6. In the example shown, time proceeds upwards on the timeline with an overall scale of 8 hours. Small swerve events (e.g., the small swerve event of FIG. 6) are detected at times $t_1$, $t_2$, $t_3$, and $t_4$. An end-of-day indication is determined at time $t_5$. The end-of-day indication comprises a lookback indication indicating to look for small swerve minor events, with a threshold number of 2 small swerve minor events. Each small swerve event comprises a minor event (e.g., an event small enough such that it is not flagged as an event when initially sensed but large enough such that it is flagged as an event when the time period is reviewed in response to the detection of a lookback event). When the data for the day is reviewed, four small swerve events are detected, greater than the threshold number of 2, so the small swerve events are indicated as minor events.

Figure 8:
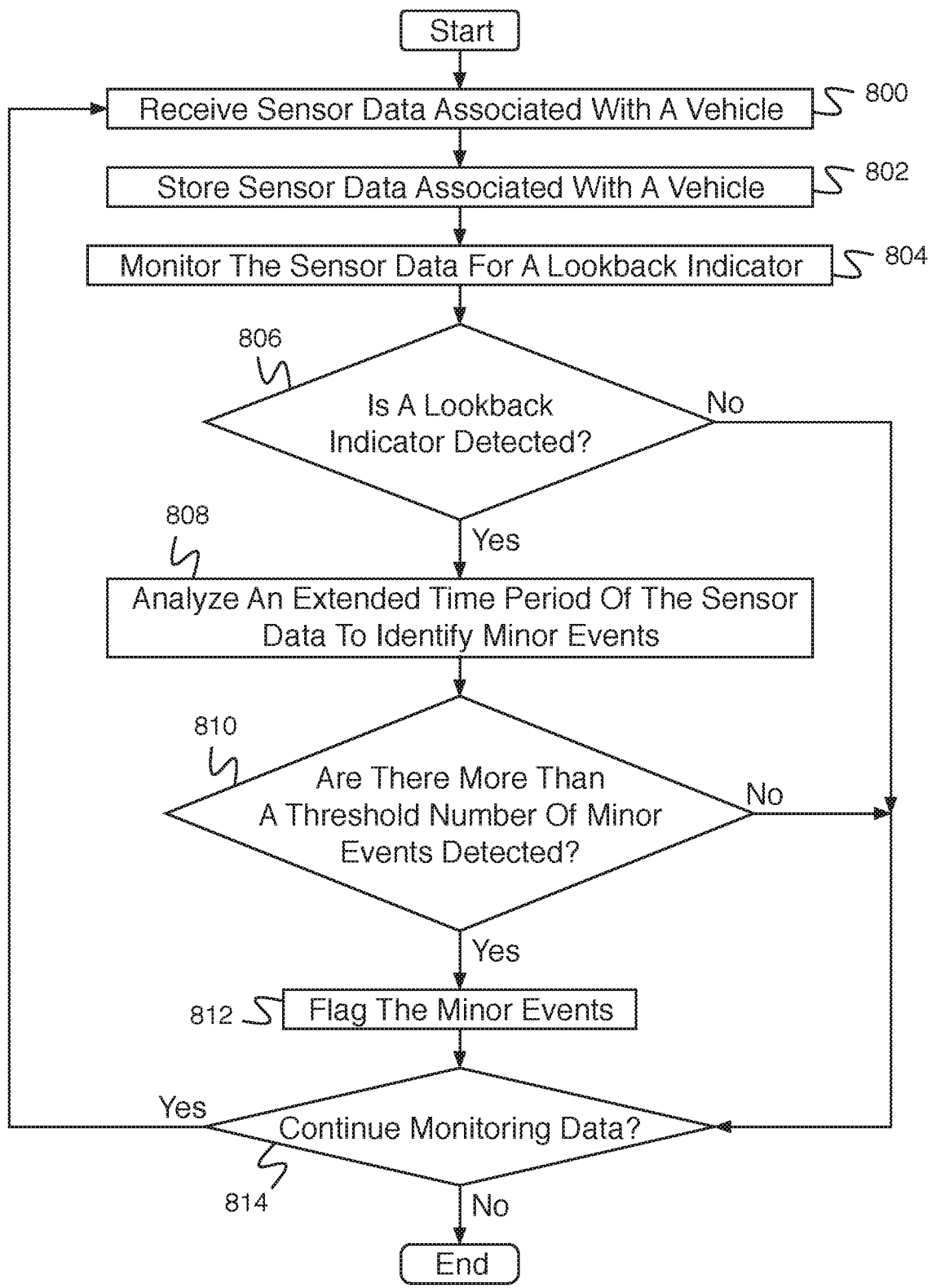
FIG. 8 is a flow diagram illustrating an embodiment of a process for extended time scale event detection.

FIG. 8 is a flow diagram illustrating an embodiment of a process for extended time scale event detection. In various embodiments, the process of FIG. 8 is performed by a vehicle event recorder (e.g., vehicle event recorder 102 of FIG. 1), by a vehicle data server (e.g., vehicle data server 104 of FIG. 1), or any other appropriate device or system. In the example shown, in 800, sensor data associated with a vehicle is received. In 802, sensor data associated with a vehicle is stored. In some embodiments, the sensor data is monitored for major events. For example, a major event comprises an event in which a major event threshold has been crossed and the event is flagged and stored and is considered to be of interest as it indicates a collision, a hard braking event, a hard turning event, an evasive maneuver, an incident related to a reportable requirement, an incident related to a maintenance issue, an incident related to an insurance issue, an incident related to a trainable issue (e.g., trainable to improve driver performance), or any other appropriate incident. In some embodiments, a minor event comprises an event that rises above a minor event threshold (e.g., a more sensitive threshold than a major event, a more easily triggered threshold than a major event, etc.) and below a major event threshold (e.g., a less sensitive threshold than a minor event, a less easily triggered threshold than a minor event, etc.). In 804, the sensor data is monitored for a lookback indicator. In 806, it is determined whether a lookback indicator is detected. In the event a lookback indicator is not detected, control passes to 814. In the event a lookback indicator is detected, control passes to 808. A lookback indicator comprises an event type indicating to analyze previously stored data using more sensitive thresholds. In various embodiments, event types comprising lookback indicators comprise a vehicle pulling over indication, a multiple lane change indication, an abrupt change in speed indication, an end of day indication, or any other appropriate event type indication. In 808, an extended time period of the sensor data is analyzed to identify minor events. In some embodiments, minor events of one or more predetermined event types are detected (e.g., only minor events of the one or more predetermined event types are searched for within the extended time period). In some embodiments, the predetermined event types are associated with the lookback indicator type. In 810, it is determined whether more than a threshold number of minor events are detected. In some embodiments, the threshold number of minor events is associated with the lookback indicator type. In some embodiments, the threshold number of minor events comprises 0 minor events. In some embodiments, the threshold number of minor events is greater than 0 minor events. In the event more than a threshold number of minor events are not detected, control passes to 814. In the event more than a threshold number of minor events are detected, control passes to 812. In 812, the minor events are flagged. In some embodiments, flagging the minor events comprises providing an indication to store flag data associated with the minor event. In some embodiments, data associated with the minor event is provided to a server. In 814, it is determined whether to continue monitoring the data. In the event it is determined to continue monitoring the data, control passes to 800. In the event it is determined not to continue monitoring the data, the process ends.

Figure 9:
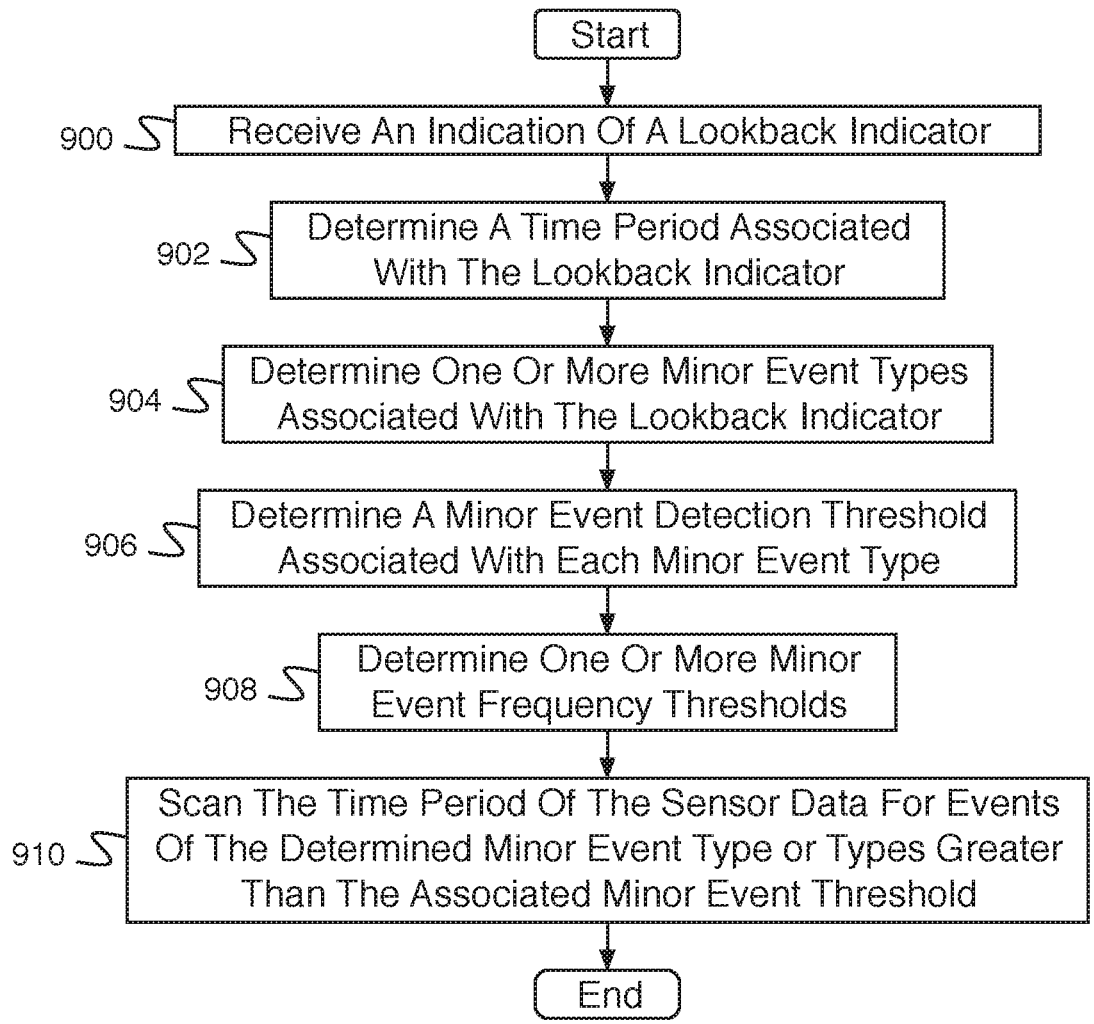
FIG. 9 is a flow diagram illustrating an embodiment of a process for analyzing an extended time period of sensor data to identify minor events.

FIG. 9 is a flow diagram illustrating an embodiment of a process for analyzing an extended time period of sensor data to identify minor events. In some embodiments, the process of FIG. 9 implements 808 of FIG. 8. In the example shown, in 900, an indication of a lookback indicator is received. In 902, a time period associated with the lookback indicator is determined. In 904, one or more minor event types associated with the lookback indicator are determined. In 906, a minor event detection threshold associated with each minor event type is determined (e.g., associated with the lookback indicator). In some embodiments, a minor event detection threshold is more sensitive than a major event detection threshold. In 908, one or more minor event frequency thresholds are determined. In various embodiments, a minor event frequency threshold is associated with a single minor event type, a combination of minor event types, all minor event types, or any other appropriate set of minor event types. In 910, the time period of the sensor data is scanned for events of the determined minor event type or types greater than the associated minor event threshold. For example, the time period is scanned and a count is determined for the number of minor events associated with the time period (e.g., within a determined time period—for example, 1 hour, 15 minutes, 8 hours—determine a number of events—for example, 6 minor events—and store the number of events).

Figure 10:
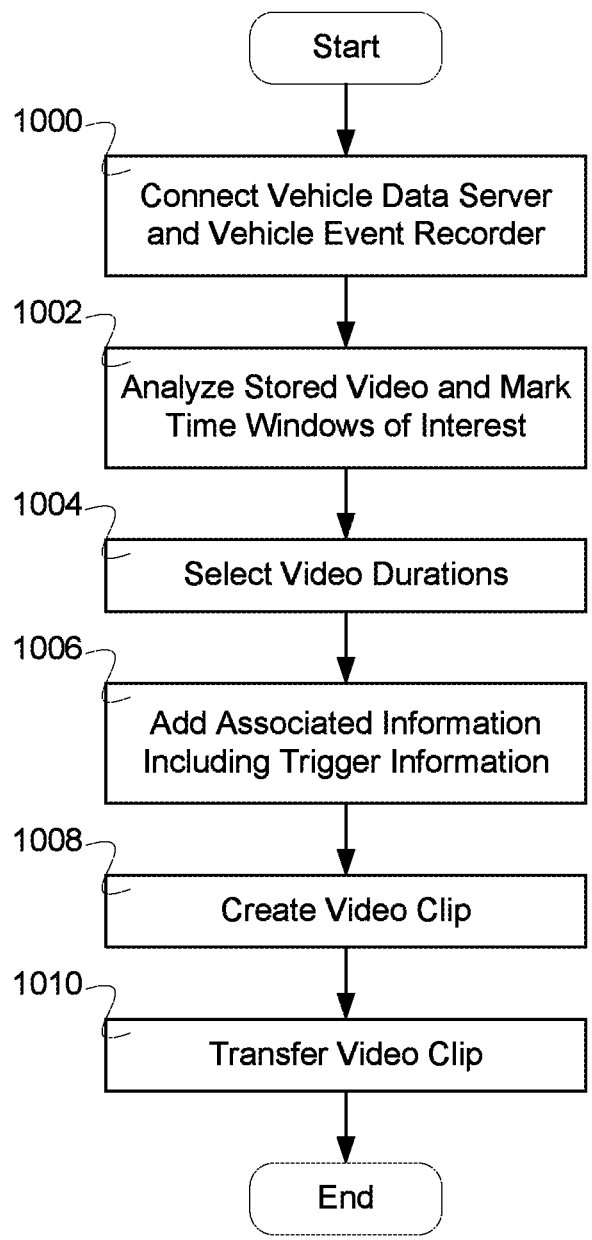
FIG. 10 is a flow diagram illustrating an embodiment of a process for analyzing and transferring events.

FIG. 10 is a flow diagram illustrating an embodiment of a process for analyzing and transferring events. In some embodiments, the process of FIG. 10 is implemented using the system of FIG. 1. In the example shown, in 1000 the vehicle data server and the vehicle event recorder are connected. For example, access to stored events on the vehicle event recorder is achieved using a connection from a vehicle data server to a vehicle event recorder. In some embodiments, access is not made using the vehicle data server but using a direct connection to a vehicle event recorder. In 1002, stored video is analyzed and time windows of interest are marked. For example, the analysis identifies a time or a window of interest and these are designated using markers in the video stream (e.g., an event video marker, a start video marker, a stop video marker, etc.). In 1004, a video duration is selected. For example, a standard video duration is selected (e.g., 4 seconds, 8 seconds, 10 seconds, etc.) or a custom video length is selected. In 1006, associated information is added including trigger information. For example information is added to be stored associated with the video of an event (e.g., trigger information, threshold information, time stamp, location information, sensor information, analysis information, etc.). In 1008, a video clip is created. For example, a clip is generated using the selected duration and the marked indication within a video stream. In various embodiments, the video clip starts at the video marker and extends for the selected duration, the video clip brackets the video marker with a percentage or predetermined time before of the marker and a percentage or predetermined time after the marker, or any other appropriate manner of selecting a video clip. In some embodiments, a standard video clip and a custom video clip are created. In 1010, the video clip is transferred. For example, upon establishment of a suitable connection (e.g., a high bandwidth connection at a Wifi point) the video clip and associated information are transferred. In some embodiments, after transfer the information is reanalyzed to confirm the initial analysis. In some embodiments, additional information is added to be associated with the video clip (e.g., driver score, coaching information, etc.).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for extended time scale event detection, comprising:
a data storage device configured to store sensor data associated with a vehicle; and
a processor configured to:
identify major events in the stored sensor data, wherein a major event is detected using a major event threshold, the major event being a collision, a braking event, a turning event, an evasive maneuver, an incident related to a reportable requirement, an incident related to a maintenance issue, an incident related to an insurance issue, an incident related to a trainable issue, or any combination thereof;
flag the major events;
determine whether the stored sensor data includes a lookback indicator, wherein the lookback indicator comprises one or more of: a vehicle pulling over indicator, a multiple lane change indicator, a change in speed indicator, or an end of day indication;
in response to the determination that the stored sensor data includes the lookback indicator:
determine an extended time period of the sensor data based on one or more minor event types, wherein the one or more minor event types includes one or more of the following: a small impact, a small swerve, a rapid lane change, and/or a vehicle stop in a road shoulder, wherein the small impact is equal to or less than a first impact threshold and greater than a second impact threshold, the first impact threshold being larger than the second impact threshold, wherein the small swerve is equal to or less than a first swerve threshold and greater than a second swerve threshold, the first swerve threshold being larger than the second swerve threshold, and wherein the rapid lane change is equal to or less than a first lane change threshold and greater than a second lane change threshold, the first lane change threshold being larger than the second lane change threshold;
analyze the extended time period of the sensor data to identify minor events, wherein the minor events are detected using minor event thresholds, wherein the minor event thresholds are more sensitive thresholds than thresholds associated with corresponding major events or are more easily triggered thresholds than the thresholds associated with the corresponding major events, wherein the minor event thresholds are lower than the major event threshold, wherein each minor event is less than a corresponding major event threshold and is greater than or equal to a corresponding minor event threshold, and wherein the analyzing of the extended time period of the sensor data comprises:
determine a minor event type associated with a minor event; and
determine a threshold number of minor events based on a first minor event type or a second minor event type;
determine whether a number of the minor events over the extended time period is equal to or exceeds the threshold number of minor events; and
in response to the determination that the number of the minor events is equal to or exceeds the threshold number of minor events, flag the minor events; and
output the flagged events for training a driver of the vehicle, comprising to:
connect to a vehicle data server;
create a video clip associated with one of the flagged minor events based on a selected video duration, a marked time of interest, and added trigger information; and
output the video clip.

2. The system of claim 1, wherein the sensor data comprises one or more of: video data, audio data, accelerometer data, GPS data, or vehicle state sensor data.

3. The system of claim 1, wherein a continuous stream of sensor data is stored.

4. The system of claim 1, wherein the data storage device comprises one of: a hard drive, an integrated circuit memory, a removable media storage device, a magnetic data storage device, an optical data storage device, a video cassette recorder, or a digital video recorder.

5. The system of claim 1, wherein the threshold number of minor events comprises 0 minor events.

6. The system of claim 1, wherein the threshold number of minor events is greater than 0 minor events.

7. The system of claim 1, wherein one or more predetermined minor event types for detection are associated with the lookback indicator.

8. The system of claim 1, wherein one or more minor event thresholds are associated with the lookback indicator.

9. The system of claim 1, wherein the extended time period is associated with the lookback indicator.

10. The system of claim 1, wherein flagging the minor events comprises providing an indication to store flag data associated with the minor event.

11. A method for extended time scale event detection, comprising:
storing sensor data associated with a vehicle;
identifying major events in the stored sensor data, wherein a major event is detected using a major event threshold, the major event being a collision, a braking event, a turning event, an evasive maneuver, an incident related to a reportable requirement, an incident related to a maintenance issue, an incident related to an insurance issue, an incident related to a trainable issue, or any combination thereof;
flagging the major events;
determining whether the stored sensor data includes a lookback indicator, wherein the lookback indicator comprises one or more of: a vehicle pulling over indicator, a multiple lane change indicator, a change in speed indicator, or an end of day indication;
in response to the determination that the stored sensor data includes the lookback indicator:
determining an extended time period of the sensor data based on one or more minor event types, wherein the one or more minor event types includes one or more of the following: a small impact, a small swerve, a rapid lane change, and/or a vehicle stop in a road shoulder, wherein the small impact is equal to or less than a first impact threshold and greater than a second impact threshold, the first impact threshold being larger than the second impact threshold, wherein the small swerve is equal to or less than a first swerve threshold and greater than a second swerve threshold, the first swerve threshold being larger than the second swerve threshold, and wherein the rapid lane change is equal to or less than a first lane change threshold and greater than a second lane change threshold, the first lane change threshold being larger than the second lane change threshold;
analyzing, using a processor, the extended time period of the sensor data to identify minor events, wherein the minor events are detected using minor event thresholds, wherein the minor event thresholds are more sensitive thresholds than thresholds associated with corresponding major events or are more easily triggered thresholds than the thresholds associated with the corresponding major events, wherein the minor event thresholds are lower than the major event threshold, wherein each minor event is less than a corresponding major event threshold and is greater than or equal to a corresponding minor event threshold, and wherein the analyzing of the extended time period of the sensor data comprises:
  determining a minor event type associated with a minor event; and
  determining a threshold number of minor events based on a first minor event type or a second minor event type;
determining whether a number of the minor events over the extended time period is equal to or exceeds the threshold number of minor events; and
in response to the determination that the number of the minor events is equal to or exceeds the threshold number of minor events, flagging the minor events; and
outputting the flagged events for training a driver of the vehicle, comprising:
  connecting to a vehicle data server;
  creating a video clip associated with one of the flagged minor events based on a selected video duration, a marked time of interest, and added trigger information; and
  outputting the video clip.

12. A computer program product for extended time scale event detection, the computer program product being embodied in a non-transitory computer readable storage medium and comprising computer instructions for:
  storing sensor data associated with a vehicle;
  identifying major events in the stored sensor data, wherein a major event is detected using a major event threshold, the major event being a collision, a braking event, a turning event, an evasive maneuver, an incident related to a reportable requirement, an incident related to a maintenance issue, an incident related to an insurance issue, an incident related to a trainable issue, or any combination thereof;
  flagging the major events;
  determining whether the stored sensor data includes a lookback indicator, wherein the lookback indicator comprises one or more of: a vehicle pulling over indicator, a multiple lane change indicator, a change in speed indicator, or an end of day indication;
  in response to the determination that the stored sensor data includes the lookback indicator:
    determining an extended time period of the sensor data based on one or more minor event types, wherein the one or more minor event types includes one or more of the following: a small impact, a small swerve, a rapid lane change, and/or a vehicle stop in a road shoulder, wherein the small impact is equal to or less than a first impact threshold and greater than a second impact threshold, the first impact threshold being larger than the second impact threshold, wherein the small swerve is equal to or less than a first swerve threshold and greater than a second swerve threshold, the first swerve threshold being larger than the second swerve threshold, and wherein the rapid lane change is equal to or less than a first lane change threshold and greater than a second lane change threshold, the first lane change threshold being larger than the second lane change threshold;
    analyzing the extended time period of the sensor data to identify minor events, wherein the minor events are detected using minor event thresholds, wherein the minor event thresholds are more sensitive thresholds than thresholds associated with corresponding major events or are more easily triggered thresholds than the thresholds associated with the corresponding major events, wherein the minor event thresholds are lower than the major event threshold, wherein each minor event is less than a corresponding major event threshold and is greater than or equal to a corresponding minor event threshold, and wherein the analyzing of the extended time period of the sensor data comprises:
      determining a minor event type associated with a minor event; and
      determining a threshold number of minor events based on a first minor event type or a second minor event type;
    determining whether a number of the minor events over the extended time period is equal to or exceeds the threshold number of minor events; and
    in response to the determination that the number of the minor events is equal to or exceeds the threshold number of minor events, flagging the minor events; and
  outputting the flagged events for training a driver of the vehicle, comprising:
    connecting to a vehicle data server;
    creating a video clip associated with one of the flagged minor events based on a selected video duration, a marked time of interest, and added trigger information; and
    outputting the video clip.

* * * * *